US010338734B2

United States Patent
Tsunoda et al.

(10) Patent No.: US 10,338,734 B2
(45) Date of Patent: Jul. 2, 2019

(54) INFORMATION PROCESSING DEVICE, INFORMATION PROCESSING SYSTEM, AND NON-TRANSITORY COMPUTER-READABLE STORAGE MEDIUM

(71) Applicant: FUJITSU LIMITED, Kawasaki-shi, Kanagawa (JP)

(72) Inventors: Tadanobu Tsunoda, Yokohama (JP); Koki Hatada, Kawasaki (JP); Shan Jiang, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/623,796

(22) Filed: Jun. 15, 2017

(65) Prior Publication Data

US 2018/0011589 A1 Jan. 11, 2018

(30) Foreign Application Priority Data

Jul. 11, 2016 (JP) .................. 2016-137035

(51) Int. Cl.
  *G06F 3/041* (2006.01)
  *G06F 3/0346* (2013.01)
  *G06F 3/038* (2013.01)

(52) U.S. Cl.
  CPC ............ *G06F 3/0416* (2013.01); *G06F 3/038* (2013.01); *G06F 3/0346* (2013.01); *G06F 2203/0382* (2013.01); *G06F 2203/0383* (2013.01)

(58) Field of Classification Search
  CPC ...... G06F 3/0416; G06F 3/0346; G06F 3/038; G06F 2203/0383; G06F 2203/0382
  See application file for complete search history.

(56) References Cited

U.S. PATENT DOCUMENTS

| | | | |
|---|---|---|---|
| 2012/0092277 A1* | 4/2012 | Momchilov | ............ G06F 3/038 345/173 |
| 2012/0256835 A1* | 10/2012 | Musick, Jr. | ............. G06F 3/017 345/161 |
| 2014/0059448 A1 | 2/2014 | Lee | |
| 2014/0143345 A1 | 5/2014 | Jiang et al. | |
| 2015/0185856 A1 | 7/2015 | Liu et al. | |

FOREIGN PATENT DOCUMENTS

| | | |
|---|---|---|
| JP | 2012-43250 | 3/2012 |
| JP | 2014-44723 | 3/2014 |
| JP | 2014-103451 | 6/2014 |
| JP | 2015-519653 | 7/2015 |

* cited by examiner

*Primary Examiner* — Liliana Cerullo
(74) *Attorney, Agent, or Firm* — Staas & Halsey LLP

(57) ABSTRACT

An information processing device includes: a memory; and a processor coupled to the memory and configured to execute reception processing that includes receiving event information from a plurality of terminal devices, execute conversion processing that includes converting the event information received in a predetermined time period to a multitouch event in a format describing a plurality of touch events that occur at the same time; and execute notification processing that includes notifying a target application of the multitouch event via an operating system.

18 Claims, 12 Drawing Sheets

```
[sample.js]

canvas.addEventListener('touchmove', function(event) {
  drawLines(event.touches);
});
```

FIG. 12B

INFORMATION PROCESSING DEVICE, INFORMATION PROCESSING SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-137035, filed on Jul. 11, 2016, the entire contents of which are incorporated herein by reference.

FIELD

The embodiments discussed herein are related to an information processing device, an information processing system, a non-transitory computer-readable storage medium, and an information processing method.

BACKGROUND

In order to increase the efficiency of business conferences, device cooperation technique is being developed to create a system linking a large screen monitor, a projector and terminal devices such as smartphones. In addition, large screen televisions are becoming popular, and it is common for every family to possess terminal devices, such as a smartphone, or the like these days. Accordingly, there are increasing demands that the terminal devices such as a smartphone can control an application displayed on a large screen television not only in the office but also at home.

Figure 1:
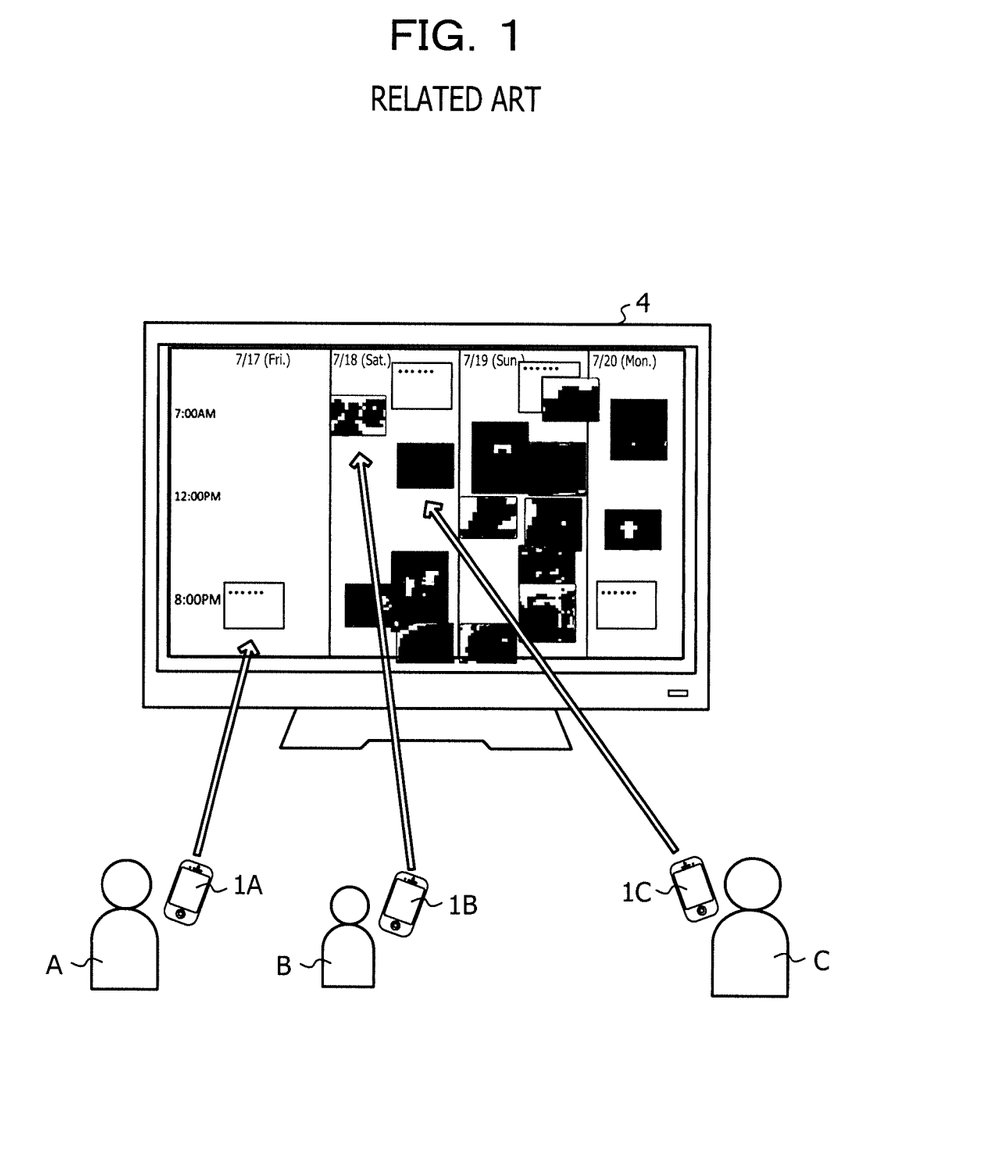
FIG. 1 is a diagram illustrating a usage example in a home.

FIG. 1 is a diagram illustrating an example of using smartphones and a television in a home. FIG. 1 illustrates a state in which users A to C in a home are using their terminal devices 1A to 1C to input texts and photographic images to a sharing application for photos and sticky notes on a screen, which is displayed on a television monitor device 4.

In general, regarding the operations performed by the terminal devices 1A to 1C, such as smartphones, or the like, the terminal devices 1A to 1C are often used as pointing devices. In such a case, displacement information in accordance with the movement (acceleration) of the terminal devices is transmitted from the terminal devices 1A to 1C as event information. In the application, the event information received from the plurality of terminal devices 1A to 1C has to be classified and processed for each terminal device.

Figure 2:
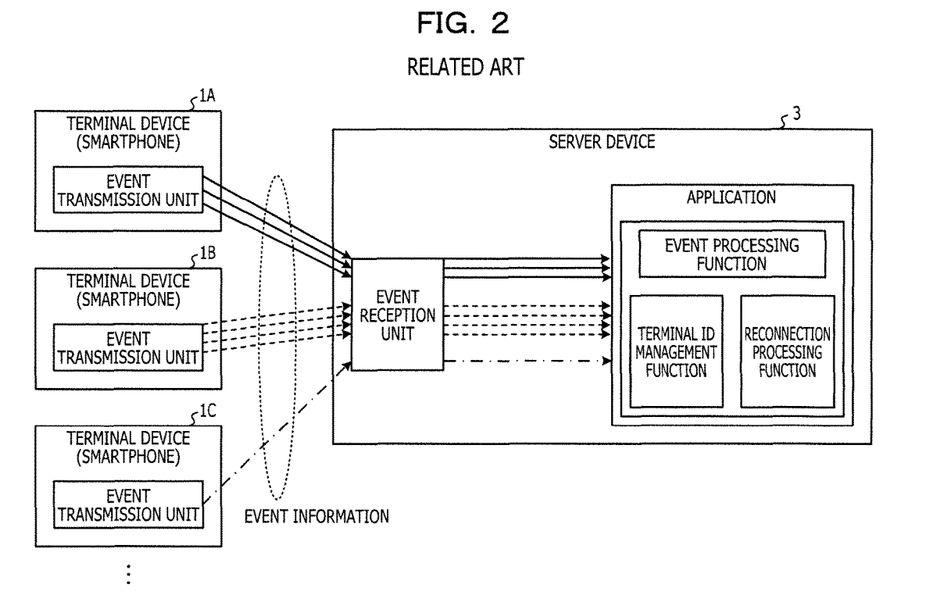
FIG. 2 is a diagram illustrating an overview of event information processing in the related art.

FIG. 2 is a diagram illustrating an overview of event information processing in the related art. In a server device 3, an event reception unit receives event information from terminal devices 1A to 1C, . . . and hands over the information to an application. In the application, an event processing function, a terminal-ID management function, and a reconnection processing function classify event information for each terminal device and perform processing in accordance with the event information (for example, refer to Japanese Laid-open Patent Publication Nos. 2014-103451 and 2012-43250, and the like).

SUMMARY

According to an aspect of the invention, an information processing device includes: a memory; and a processor coupled to the memory and configured to execute reception processing that includes receiving event information from a plurality of terminal devices, execute conversion processing that includes converting the event information received in a predetermined time period to a multitouch event in a format describing a plurality of touch events that occur at the same time; and execute notification processing that includes notifying a target application of the multitouch event via an operating system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described above, in the related-art applications, the event information from a plurality of terminal devices has to be classified and then subjected to processing. Accordingly, the problem is that complex programs have to be integrated, and thus an application development has been difficult.

In this regard, the description is the case of event information including displacement information when terminal devices are used as pointing devices. In the same manner, for other event information, the event information has to be classified and processed for processing by an application.

Thus, according to an aspect of the disclosure, it is desirable that event information processing be easily performed in an application.

In the following, a description will be given of a preferred embodiment of the present disclosure.

Figure 3:
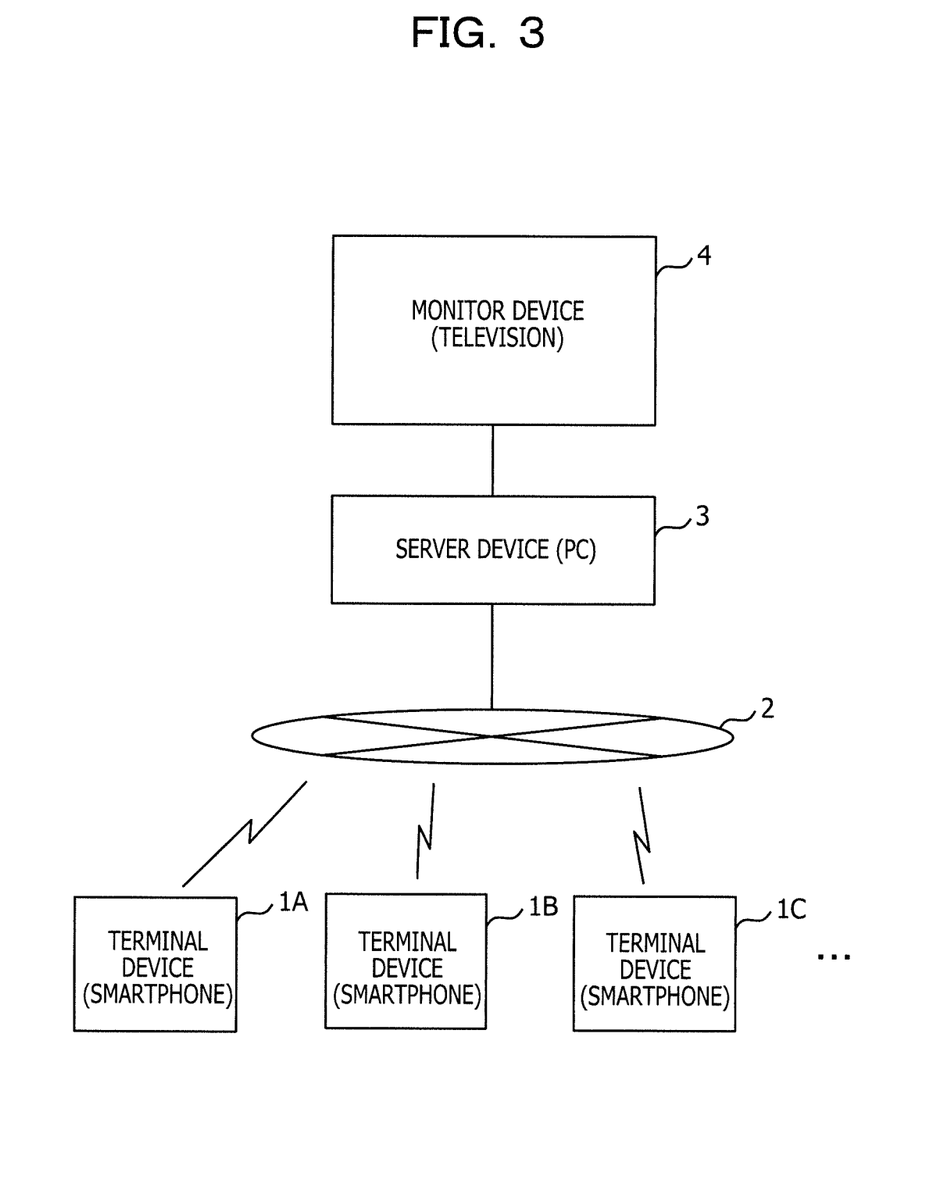
FIG. 3 is a diagram illustrating an example of a configuration of a system according to an embodiment.

FIG. 3 is a diagram illustrating an example of a configuration of a system according to the embodiment. In FIG. 3, a plurality of terminal devices 1A, 1B, 1C, . . . are directly coupled to a server device (information processing device) 3, such as a personal computer (PC), or the like via a network 2, such as a wireless local area network (LAN), or the like, or a wireless connection. In addition, a monitor device 4, such as a television, or the like is coupled to the server device 3. In this regard, the server device 3 may be built into the monitor device 4.

Figure 4:
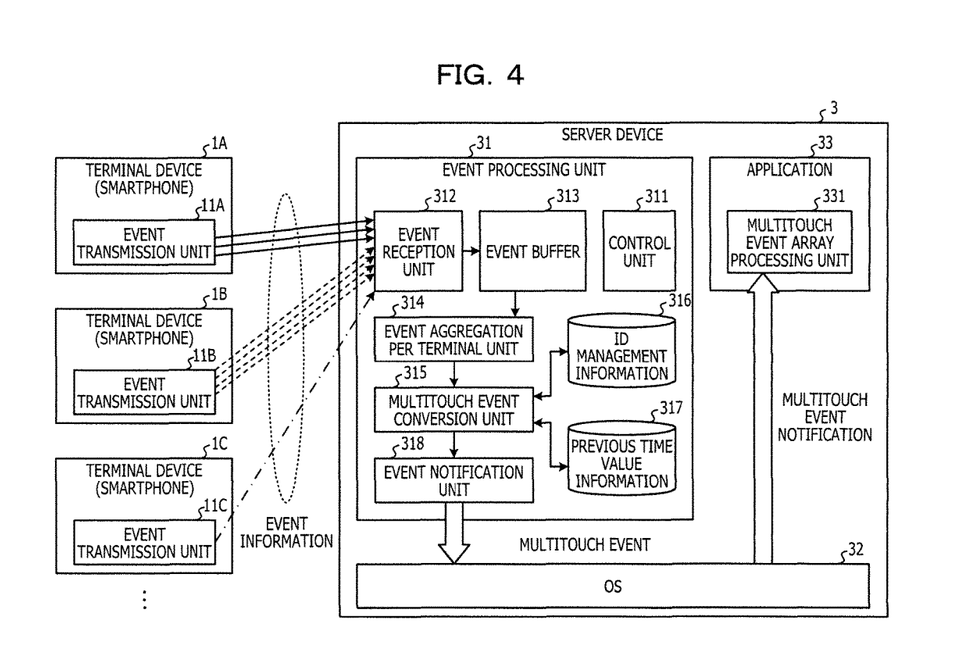
FIG. 4 is a diagram illustrating an example of a functional configuration.

FIG. 4 is a diagram illustrating an example of a functional configuration of each device. In FIG. 4, the terminal device 1 (1A, 1B, 1C, . . . ) includes an event transmission unit 11 (11A, 11B, 11C, . . . ) that transmits event information from the terminal device 1 to the server device 3.

The server device 3 includes an event processing unit 31, an operating system (OS) 32, and an application 33. The event processing unit 31 includes a control unit 311, an event reception unit 312, an event buffer 313, an event aggregation per terminal unit 314, a multitouch event conversion unit 315, ID management information 316, previous time value information 317, and an event notification unit 318. The application 33 includes a multitouch event array processing unit 331.

The event processing unit 31 has a function of receiving event information from the plurality of terminal devices 1, converting the event information to a multitouch event, and passing the multitouch event to the OS 32. A multitouch event is originally an event in which a touch state of a plurality of fingers on a touch panel is transferred at the same time. However, here, a multitouch event is used in order to transfer event information of a plurality of terminal devices 1 at the same time in a classified state using the property that enables sending a plural pieces of information at the same time in a classified state. Also, the format of a multitouch event corresponds to a standard event format of the OS, and thus it is possible to directly pass a multitouch event to the OS 32, and it is possible for the OS 32 to directly pass the multitouch event to a monitoring (listening) application 33.

The control unit 311 has a function of performing total control of the event processing unit 31. The event reception unit 312 has a function of receiving event information from a plurality of terminal devices 1 and storing the received event information in the event buffer 313. The event aggregation per terminal unit 314 has a function of aggregating the event information received by the event reception unit 312 and stored in the event buffer 313 at predetermined time intervals for each of the terminal devices 1. Here, it is assumed that the predetermined time period is shorter than a time period (tens of msecs) in which a continuous event can be determined as "continuous" by the OS 32.

The multitouch event conversion unit 315 has a function of converting the event information (aggregated event for each terminal) aggregated for each terminal device 1 to a multitouch event. At this time, in order to obtain an association relationship between a terminal ID and a position (index) of an array element of the multitouch event, the ID management information 316 is used. It is possible for the application 33 to refer to the ID management information 316 via an application program interface (API). Also, in order to convert the displacement included in the event information in the case of using the terminal device 1 as a pointing device to absolute coordinates in a multitouch event, the previous time value information 317, which holds the previous calculation result (the initial values are the coordinate values of the center of the screen), is used. The event notification unit 318 has a function of passing the multitouch event generated (converted) by the multitouch event conversion unit 315 to the OS 32.

The OS 32 performs basic control in the server device 3, and when the OS 32 detects a multitouch event from the event processing unit 31, the OS 32 notifies the application 33 of the multitouch event.

The application 33 is a program on the server device 3 that provides a display screen to be operated by the terminal devices 1 and includes the multitouch event array processing unit 331 that processes the array (multitouch event array) of the multitouch event received from the OS 32. The multitouch event array is a data structure indicating the contents (the absolute coordinates of a touched position) of the multitouch event.

Figure 5:
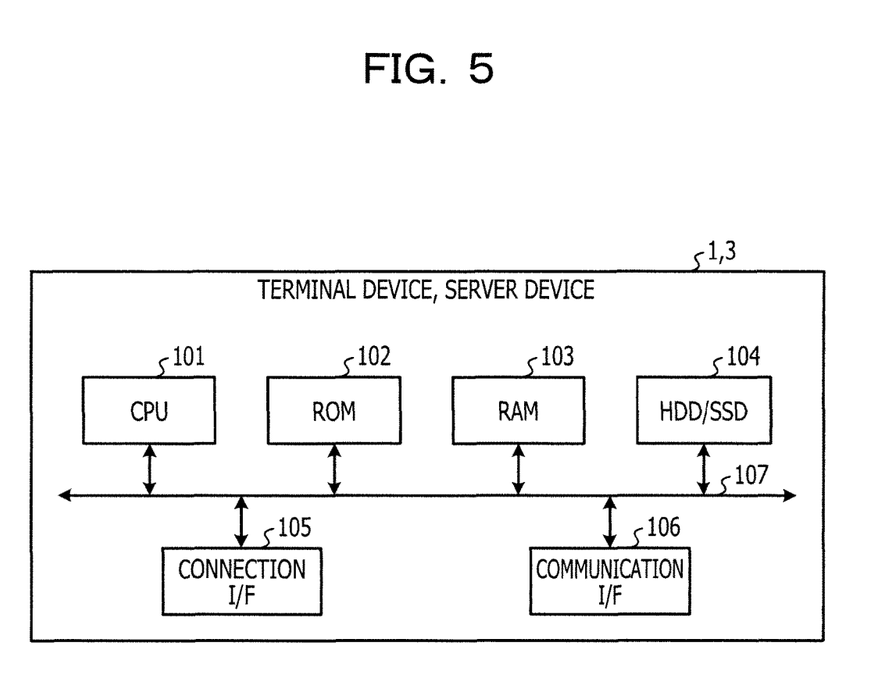
FIG. 5 is a diagram illustrating an example of a hardware configuration of a terminal device and a server device for information processing.

FIG. 5 is a diagram illustrating an example of a hardware configuration of the terminal device 1 and the server device 3. In FIG. 5, the terminal device 1, or the like includes a central processing unit (CPU) 101, a read-only memory (ROM) 102, and a random access memory (RAM) 103, which are mutually coupled via a bus 107. Also, the terminal device 1, or the like includes a hard disk drive (HDD)/solid state drive (SSD) 104, a connection interface (I/F) 105, and a communication I/F 106. The CPU 101 executes programs stored in the ROM 102 or on the HDD/SSD 104, or the like by using the RAM 103 as a work area so as to integrally control the operation of the terminal device 1, or the like. The connection I/F 105 provides an interface with a device that is coupled to the terminal device 1, or the like. The communication I/F 106 is an interface for communicating with the other information processing devices via a network.

The function of the terminal device 1, or the like, illustrated in FIG. 4, is realized by the CPU 101 executing a predetermined program. The program may be obtained via a recording medium, via a network, or may be stored in the ROM. The data referenced and updated by the processing is held in the RAM 103 or the HDD/SSD 104.

Figure 6:
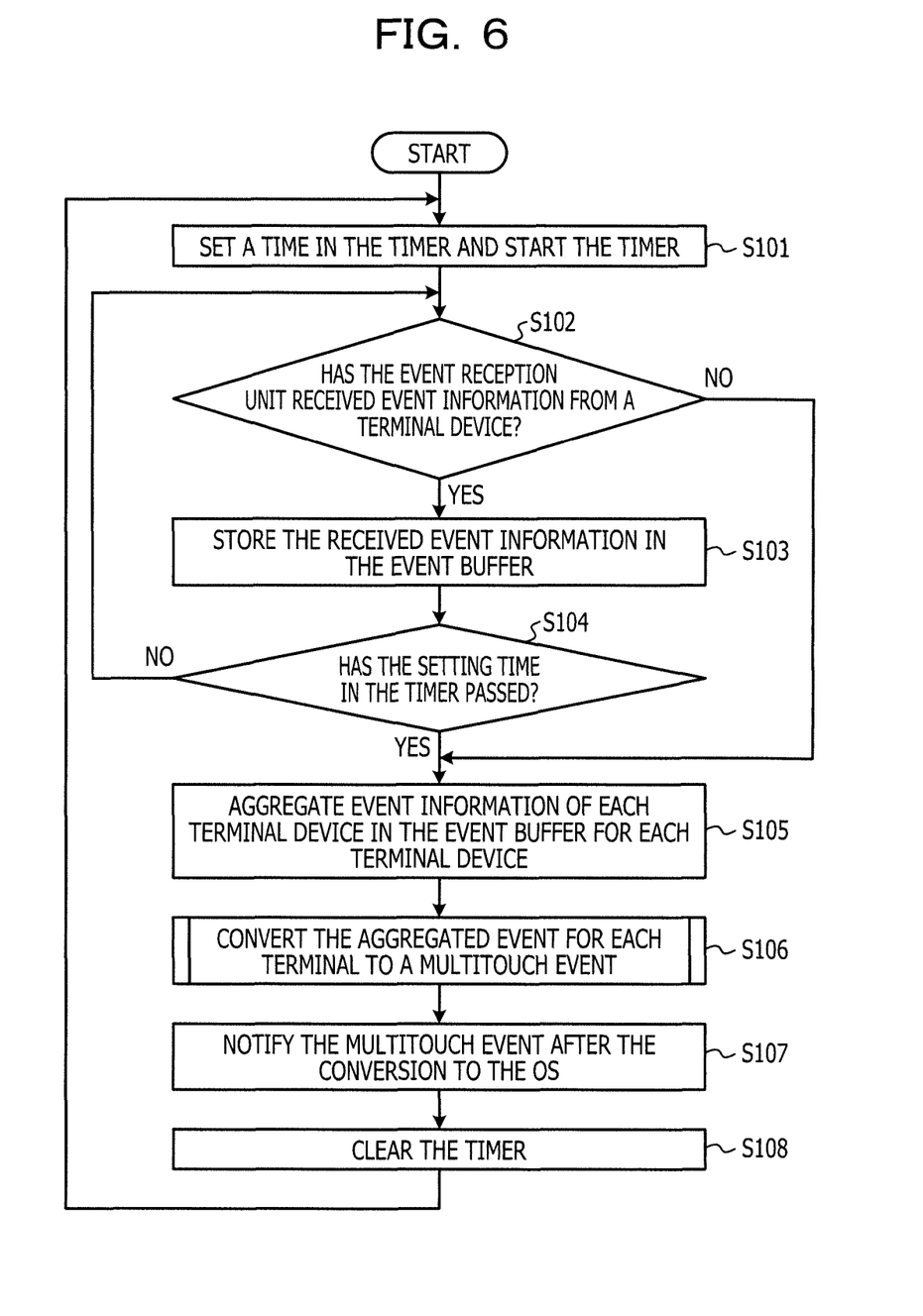
FIG. 6 is a flowchart illustrating an example of the processing according to the embodiment.
Figure 7:
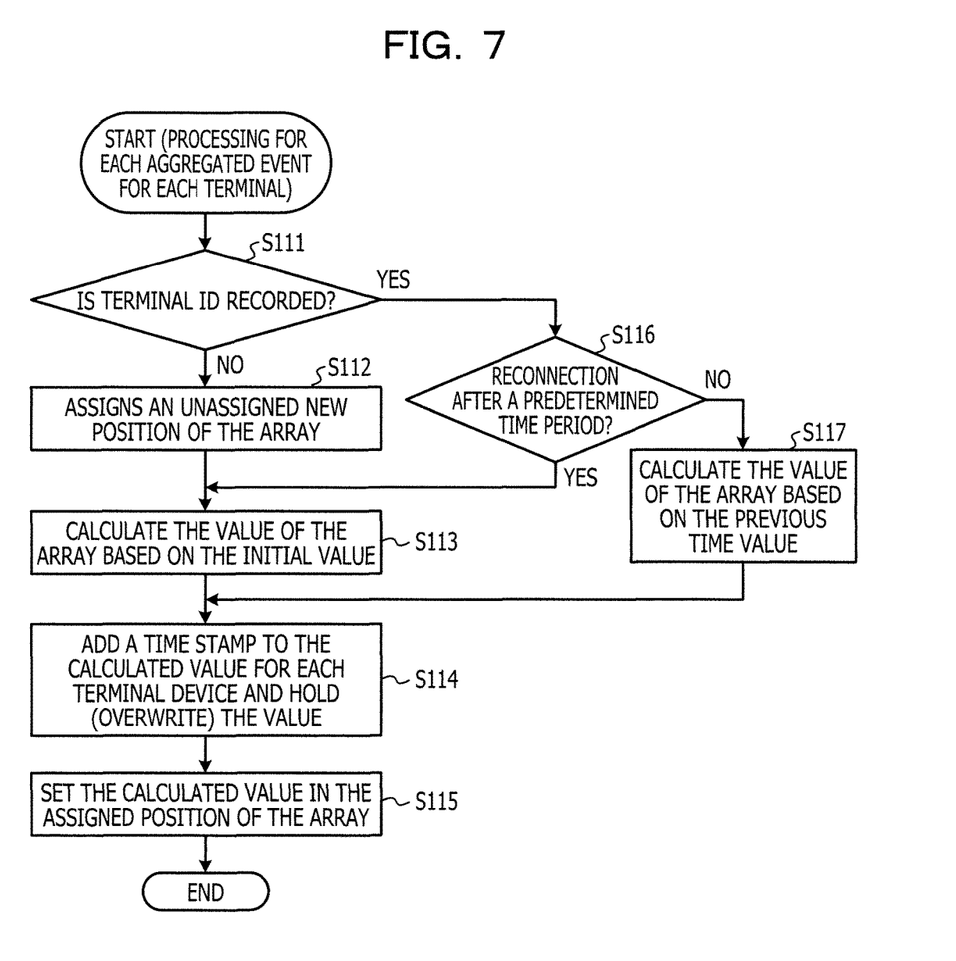
FIG. 7 is a flowchart illustrating an example of the conversion processing of multitouch events into an array.

FIG. 6 is a flowchart illustrating an example of the processing according to the embodiment. FIG. 7 is a flowchart illustrating an example of the conversion processing (step S106 in FIG. 6) of multitouch events into an array.

In FIG. 6, when the control unit 311 of the event processing unit 31 of the server device 3 starts processing, the control unit 311 sets a time in an internal timer and starts the timer (step S101). The setting time of the timer is set shorter than a time period (tens of msecs) in which a continuous event can be determined as "continuous" by the OS 32.

Next, when the event reception unit 312 receives event information from a terminal device 1 (Yes in step S102), the event reception unit 312 stores the received event information in the event buffer 313 (step S103).

Next, the control unit 311 determines whether or not the setting time of the timer has elapsed (step S104). If not elapsed (No in step S104), the processing returns to the determination of event reception (step S102).

Figure 8:
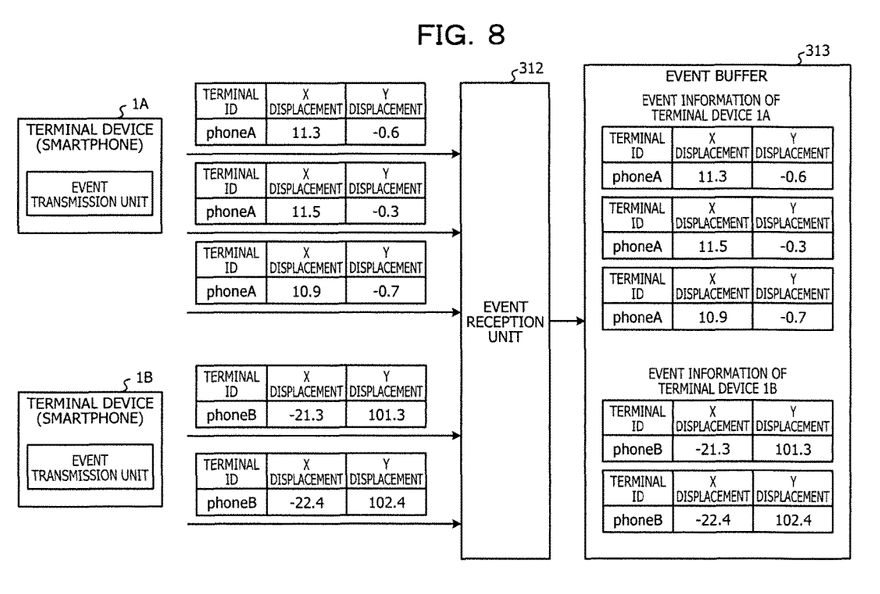
FIG. 8 is a diagram illustrating an example in which event information transmitted from a terminal device is stored in an event buffer.

FIG. 8 is a diagram illustrating an example in which event information transmitted from the terminal devices 1 is stored in the event buffer 313. The event reception unit 312 receives the event information from the terminal devices 1A and 1B one at a time, and a state in which the event information is stored in the event buffer 313 is illustrated in FIG. 8. The event information illustrated in FIG. 8 is an example in which the terminal devices 1A and 1B are used as pointing devices and includes a terminal ID that identifies the terminal devices 1A and 1B, an X-displacement (displacement in the horizontal direction) and a Y-displacement (displacement in the vertical direction). The displacements are values in accordance with the acceleration detected by the terminal device 1.

Referring back to FIG. 6, when the setting time of the timer has elapsed (Yes in step S104), the control unit 311 operates the event aggregation per terminal unit 314, and the event aggregation per terminal unit 314 aggregates the events of each of the terminal devices 1 in the event buffer 313 for each of the terminal devices 1 (step S105). When the aggregation is complete, the contents of the event buffer 313 are cleared.

Figure 9:
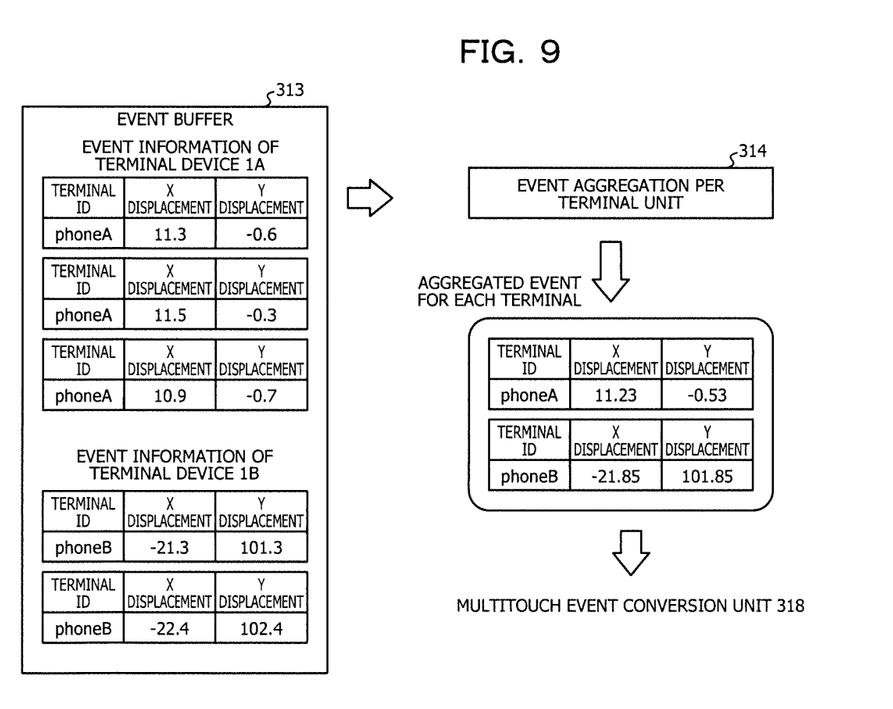
FIG. 9 is a diagram illustrating an example of generating an aggregated event for each terminal from the event information stored in the event buffer.

FIG. 9 is a diagram illustrating an example of generating an aggregated event for each terminal from the event information stored in the event buffer 313. The event buffer 313 illustrated in FIG. 9 stores the event information received in a predetermined time period, which includes displacement information as event information from the pointing device. Accordingly, for example, aggregation is performed by calculating the average of the X-displacements and the Y-displacements in the stored event information for each of the terminal devices 1. Each displacement due to acceleration of the terminal device 1 is likely to generate variation. However, by calculating the average displacement in a predetermined time period, the variation is advantageously smoothed.

Referring back to FIG. 6, when the aggregation is complete, the control unit 311 operates the multitouch event conversion unit 315 to convert the aggregated event for each terminal into a multitouch event array (step S106). A more detailed description will be given of the processing by the multitouch event conversion unit 315 with reference to FIG. 7.

In FIG. 7, when the multitouch event conversion unit 315 is started, the multitouch event conversion unit 315 performs the following processing for each aggregated event for each terminal.

First, the multitouch event conversion unit 315 determines whether or not the terminal ID of an aggregated event for each terminal is recorded in the ID management information 316 (step S111). If not recorded (No in step S111), the multitouch event conversion unit 315 assigns an unassigned new position of the array (step S112). The assignment is carried out by recording a pair of the terminal ID and the position of the array element in the ID management information 316.

Figure 10:
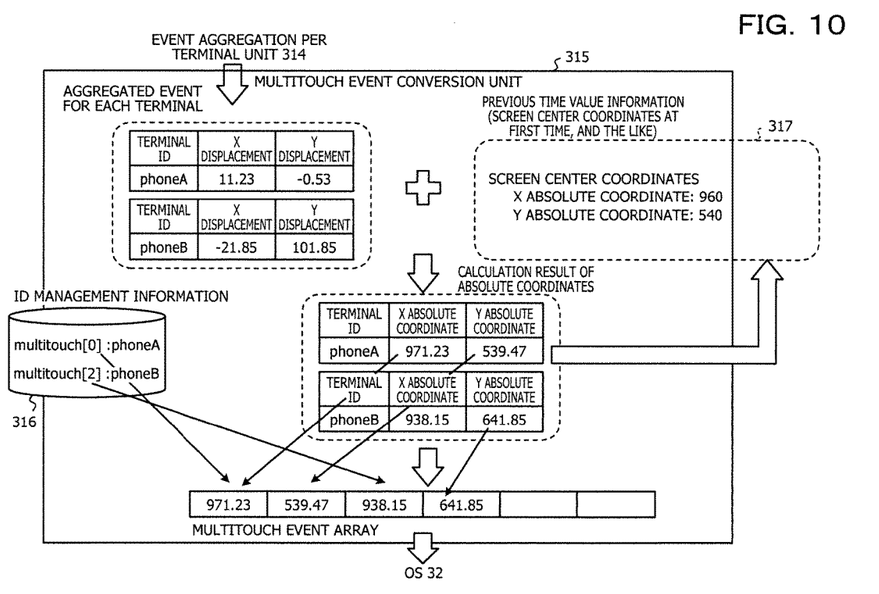
FIG. 10 is a diagram (1 of 2) illustrating an example of conversion to a multitouch event.

Next, when the multitouch event conversion unit 315 has assigned a new position, the multitouch event conversion unit 315 calculates a value to be set in the array element based on the center coordinates of the display screen of the monitor device 4 as the initial values (step S113). That is to say, the multitouch event conversion unit 315 calculates the absolute coordinates in the X-direction and the Y-direction produced by adding the displacement information of the aggregated event for each terminal to the center coordinates of the display screen. The center coordinates of the display screen are set in advance or are dynamically obtained. FIG. 10 is a diagram illustrating an example of conversion to a multitouch event. In the example illustrated in FIG. 10, when the terminal IDs of the aggregated event for each terminal "PhoneA" and "PhoneB" are not recorded in the ID management information 316, the ID management information 316 is newly recorded, and thus a state in which the displacement information of the aggregated event for each terminal was added to the screen center coordinates of the previous time value information 317 to calculate the absolute coordinates is illustrated.

Referring back to FIG. 7, the multitouch event conversion unit 315 adds a time stamp to the calculated value for each of the terminal devices 1 and holds the value for the calculation at the next time (step S114).

Next, the multitouch event conversion unit 315 sets the calculated value at the assigned position of the array element (step S115) and terminates the processing. In FIG. 10, it is assumed that a terminal ID "PhoneA" is assigned to the array element position [0], and a terminal ID "PhoneB" is assigned to the array element position [2] in the ID management information 316. In this case, the values of the X-absolute coordinate of "PhoneA", the Y-absolute coordinate of "PhoneA", the X-absolute coordinate of "PhoneB", and the Y-absolute coordinate of "PhoneB" are set in the multitouch event array respectively in this order from the beginning.

Referring back to FIG. 7, if the terminal ID in the aggregated event for each terminal is recorded (Yes in step S111), the multitouch event conversion unit 315 determines whether or not the connection is a reconnection after a lapse of a predetermined time period based on the time stamp of the previous time value information 317 (step S116). The predetermined time period in this case is for allowing reconnection as the event information from the same terminal device 1 when the event information is interrupted due to a temporary disconnection, or the like. The predetermined time period is set to a time interval longer than the time interval during which the event information is aggregated in the event aggregation per terminal unit 314. If the connection is a reconnection after the lapse of the predetermined time period (Yes in step S116), the values to be set in the array elements are calculated based on the center coordinates of the display screen of the monitor device 4 as initial values in the same manner as the case of new recording (step S113). The subsequent processing (step S114 and S115) is the same as described above.

Figure 11:
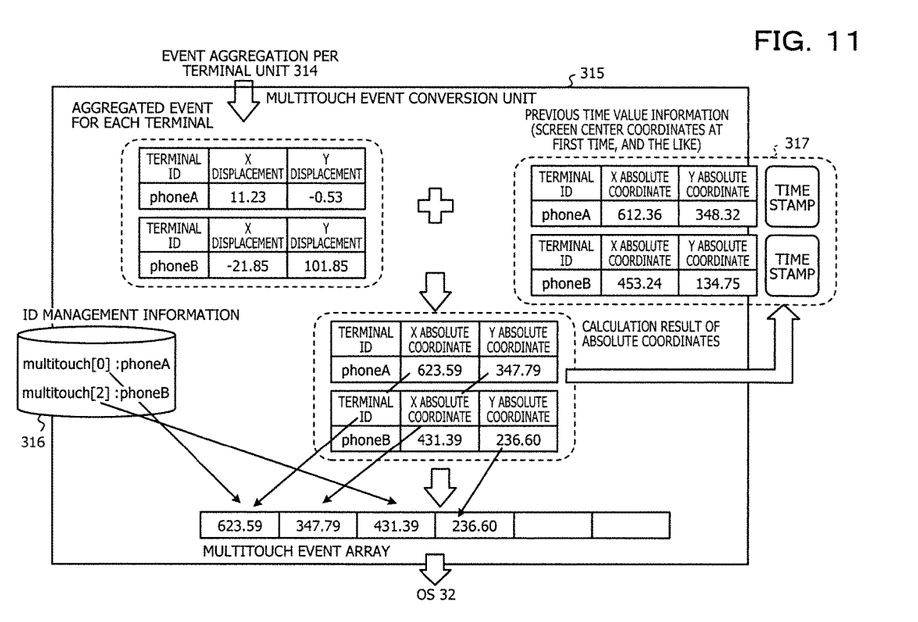
FIG. 11 is a diagram (2 of 2) illustrating an example of conversion to a multitouch event.

Also, if the connection is not a reconnection after a lapse of the predetermined time period (No in step S116), the multitouch event conversion unit 315 calculates the values to be set in the array elements based on the previous values for each terminal device 1, which are held in the previous time value information 317 (step S117). FIG. 11 illustrates the state in which the absolute coordinates are calculated by adding the X-displacement value and the Y-displacement value of the aggregated event for each terminal to the X-absolute coordinate and the Y-absolute coordinate of each terminal device 1 of the previous time value information 317, respectively, when the terminal IDs "PhoneA" and "PhoneB" of the aggregated event for each terminal are recorded in the ID management information 316 and the connection is not a reconnection after a lapse of the predetermined time period.

Referring back to FIG. 7, the multitouch event conversion unit 315 adds a time stamp to the calculated values for each terminal device 1 and holds the values for the subsequent calculation (existing values are overwritten) (step S114). Next, the multitouch event conversion unit 315 sets the calculated values at the assigned position of the array (step S115), and the processing is terminated.

Referring back to FIG. 6, when the multitouch event conversion unit 315 has performed conversion to the multitouch event, the event notification unit 318 notifies the OS 32 of the multitouch event after the conversion (step S107), and the control unit 311 clears the timer (step S108). The control unit 311 repeats the processing from the step of setting the timer and starting (step S101).

When the OS 32 receives the notification of the multitouch event, the OS 32 notifies the application 33 of the multitouch event, and the multitouch event array processing unit 331 of the application 33 performs predetermined processing in accordance with the contents of the multitouch event array.

Figure 12A:
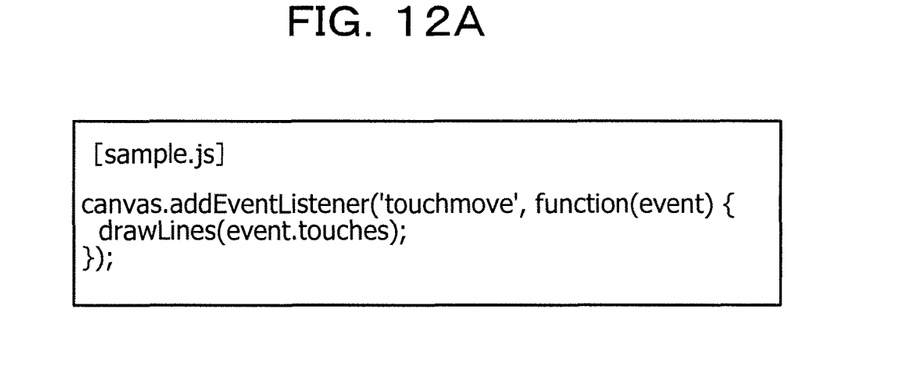
FIGS. 12A and 12B are diagrams illustrating an example of a program that draws a locus for each terminal device based on a multitouch event array.

FIGS. 12A and 12B are diagrams illustrating an example of a program that draws a locus for each of the terminal devices 1 based on a multitouch event array. In FIG. 12A, "canvas.addEventListener" is a description that records an event listener for an event target "canvas" and invokes the event listener. The event listener illustrated in FIG. 12A listens to an event having the type "touchmove", and if an event of this type occurs, the command "drawLines" draws a line in accordance with the touch contents "event.touches". The multitouch event received from the OS 32 corresponds to an event of the type "touchmove", and the touch contents are indicated by the multitouch event array.

Figure 12B:
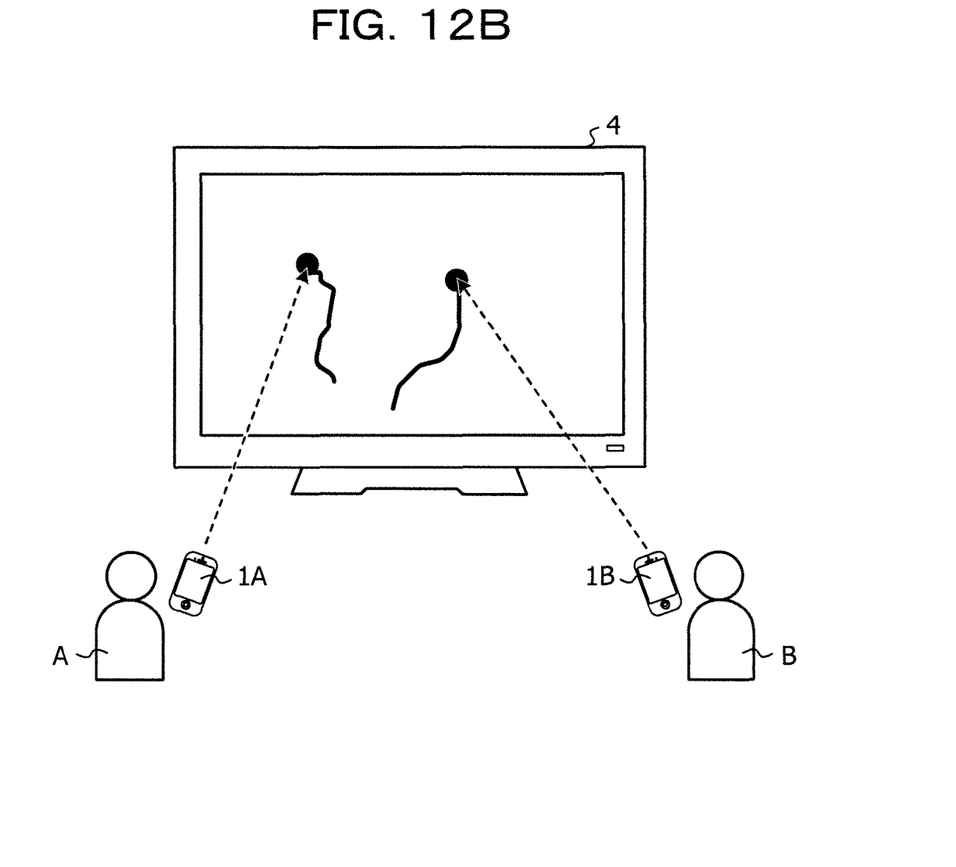

FIG. 12B illustrates a state in which terminal devices 1A and 1B of users A and B of the monitor device 4 are drawing on a display screen by using the program described above. Each of the pieces of event information from the terminal devices 1A and 1B that are operated by users A and B, respectively, is distinguished by the array element position of the multitouch event and is thus drawn as a separate line. Also, a determination is made by the OS 32 as to whether or not continuous drawing is performed from the time interval of the event, and thus the application 33 does not have to make the determination.

In this regard, it is possible to distinguish event information from a different terminal device 1 from only the multitouch event array, but it is not possible to identify a terminal device 1. If a terminal device 1 has to be identified, the ID management information 316 is referred to via the API, and a terminal ID is obtained from the element position of the multitouch event array.

In this regard, a description has been given of the case of the event information including displacement using a terminal device 1 as a pointing device. It is possible to include data having the other formats, such as audio data, video data, or the like instead of displacement.

As described above, with the present embodiment, it is possible to make it easy to perform event information processing in an application.

In the above, a description has been given with a preferred embodiment. Here, the description has been given by a specific example. However, it is obvious that various modifications and changes may be made to the specific example described above without departing from the spirit and scope of the appended claims. That is to say, the present disclosure shall not be interpreted to be limited by the details of the specific example and the accompanying diagrams.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to,
execute reception processing that includes receiving event information from a plurality of terminal devices,
execute conversion processing that includes converting the event information received in a predetermined time period to a multitouch event in a format describing a plurality of touch events that occur at same time; and
execute notification processing that includes notifying a target application of the multitouch event via an operating system,
wherein the multitouch event includes a plurality of array elements,
wherein the conversion processing is configured to store, in a first element of the multitouch event, a value derived from the event information, the first element being one element of the plurality of array elements and being located at an array index corresponding to a terminal device from which the event information is received.

2. The information processing device according to claim 1,
wherein the conversion processing includes aggregating the event information received in the predetermined time period for each of the terminal devices and converting the event information to the multitouch event.

3. The information processing device according to claim 2,
wherein the conversion processing includes, regarding the event information including displacements of the terminal devices, calculating the average of the displacements of the event information received in the predetermined time period for each of the terminal devices so as to aggregate the event information.

4. The information processing device according to claim 3,
wherein the conversion processing includes, regarding the event information including displacements of the terminal devices, calculating absolute coordinates of a display screen and setting the absolute coordinates in array elements corresponding to the terminal devices of the multitouch event.

5. The information processing device according to claim 4,
wherein the conversion processing includes, regarding a terminal device for which the event information has been interrupted, leaving array elements corresponding to the terminal device of the multitouch event empty, and regarding a terminal device for which the event information has arrived again, setting values to same array elements of the multitouch event as elements to which values corresponding to the terminal device were set at a previous time.

6. The information processing device according to claim 5,
wherein the conversion processing includes, regarding the event information including a displacement of the terminal device, for a terminal device for which the event information has arrived again within a predetermined period, calculating absolute coordinates based on a calculation result of the absolute coordinates of the previous time, and
regarding a terminal device for which the event information has arrived again after an elapse of the predetermined period, calculating the absolute coordinates based on center coordinates of the display screen in same manner as the previous time.

7. An information processing system comprising:
a plurality of terminal devices; and
an information processing device,
  wherein the terminal devices are configured to execute transmission processing that includes transmitting event information,
  wherein the information processing device is configured to,
    execute reception processing that includes receiving the event information from the plurality of terminal devices,
    execute conversion processing that includes converting the event information received in a predetermined time period to a multitouch event in a format describing a plurality of touch events that occur at same time; and
    execute notification processing that includes notifying a target application of the multitouch event via an operating system,
    wherein the multitouch event includes a plurality of array elements,
    wherein the conversion processing is configured to store, in a first element of the multitouch event, a value derived from the event information, the first element being one element of the plurality of array elements and being located at an array index corresponding to a terminal device from which the event information is received.

8. The information processing system according to claim 7,
  wherein the conversion processing includes aggregating the event information received in the predetermined time period for each of the terminal devices and converting the event information to the multitouch event.

9. The information processing system according to claim 8,
  wherein the conversion processing includes, regarding the event information including displacements of the terminal devices, calculating the average of the displacements of the event information received in the predetermined time period for each of the terminal devices so as to aggregate the event information.

10. The information processing system according to claim 9,
  wherein the conversion processing includes, regarding the event information including displacements of the terminal devices, calculating absolute coordinates of a display screen and setting the absolute coordinates in array elements corresponding to the terminal devices of the multitouch event.

11. The information processing system according to claim 10,
  wherein the conversion processing includes, regarding a terminal device for which the event information has been interrupted, leaving array elements corresponding to the terminal device of the multitouch event empty, and regarding a terminal device for which the event information has arrived again, setting values to same array elements of the multitouch event as the elements to which values corresponding to the terminal device were set at a previous time.

12. The information processing system according to claim 11,
  wherein the conversion processing includes, regarding the event information including a displacement of the terminal device, for a terminal device for which the event information has arrived again within a predetermined period, calculating absolute coordinates based on a calculation result of the absolute coordinates of the previous time, and
  regarding a terminal device for which the event information has arrived again after an elapse of the predetermined period, calculating the absolute coordinates based on center coordinates of the display screen in same manner as the previous time.

13. A non-transitory computer-readable storage medium storing a program that causes a computer to execute a process, the process comprising:
  executing reception processing that includes receiving event information from a plurality of terminal devices,
  executing conversion processing that includes converting the event information received in a predetermined time period to a multitouch event in a format describing a plurality of touch events that occur at same time; and
  executing notification processing that includes notifying a target application of the multitouch event via an operating system,
  wherein the multitouch event includes a plurality of array elements,
  wherein the conversion processing is configured to store, in a first element of the multitouch event, a value derived from the event information, the first element being one element of the plurality of array elements and being located at an array index corresponding to a terminal device from which the event information is received.

14. The non-transitory computer-readable storage medium according to claim 13,
  wherein the conversion processing includes aggregating the event information received in the predetermined time period for each of the terminal devices and converting the event information to the multitouch event.

15. The non-transitory computer-readable storage medium according to claim 14,
  wherein the conversion processing includes, regarding the event information including displacements of the terminal devices, calculating the average of the displacements of the event information received in the predetermined time period for each of the terminal devices so as to aggregate the event information.

16. The non-transitory computer-readable storage medium according to claim 15,
  wherein the conversion processing includes, regarding the event information including displacements of the terminal devices, calculating absolute coordinates of a display screen and setting the absolute coordinates in array elements corresponding to the terminal devices of the multitouch event.

17. The non-transitory computer-readable storage medium according to claim 16,
  wherein the conversion processing includes, regarding a terminal device for which the event information has been interrupted, leaving array elements corresponding to the terminal device of the multitouch event empty, and regarding a terminal device for which the event information has arrived again, setting values to same array elements of the multitouch event as the elements to which values corresponding to the terminal device were set at a previous time.

18. The non-transitory computer-readable storage medium according to claim 17,
  wherein the conversion processing includes, regarding the event information including a displacement of the terminal device, for a terminal device for which the event information has arrived again within a predetermined period, calculating absolute coordinates based on a calculation result of the absolute coordinates of the previous time, and regarding a terminal device for which the event information has arrived again after an elapse of the predetermined period, calculating the absolute coordinates based on center coordinates of the display screen in same manner as the previous time.

* * * * *